Dec. 16, 1969   J. C. CUMMING   3,484,138
VEHICLE BRAKE CONTROL MECHANISM
Filed July 3, 1968   3 Sheets-Sheet 1
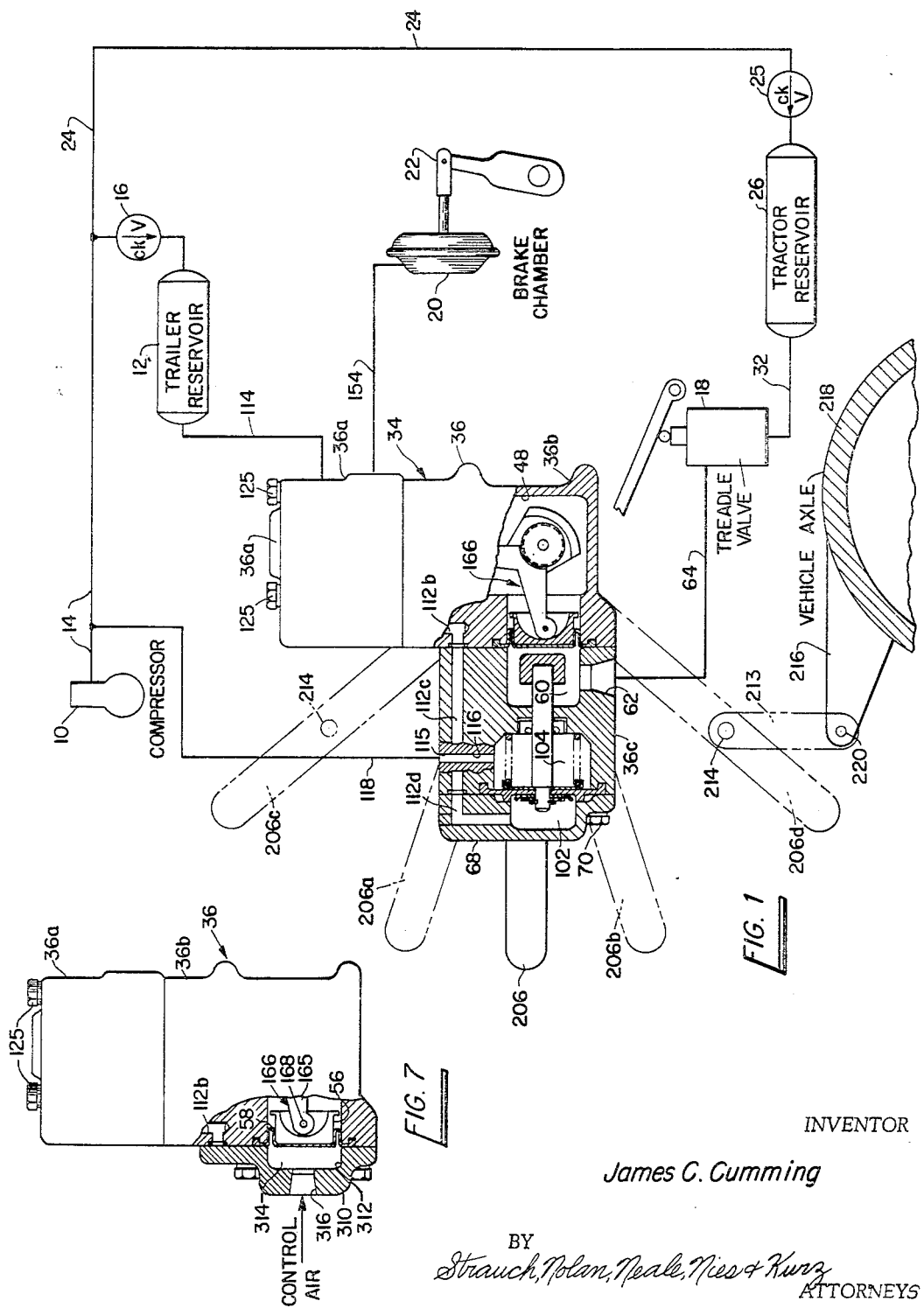
INVENTOR
James C. Cumming
BY
Strauch, Nolan, Neale, Nies & Kurz
ATTORNEYS

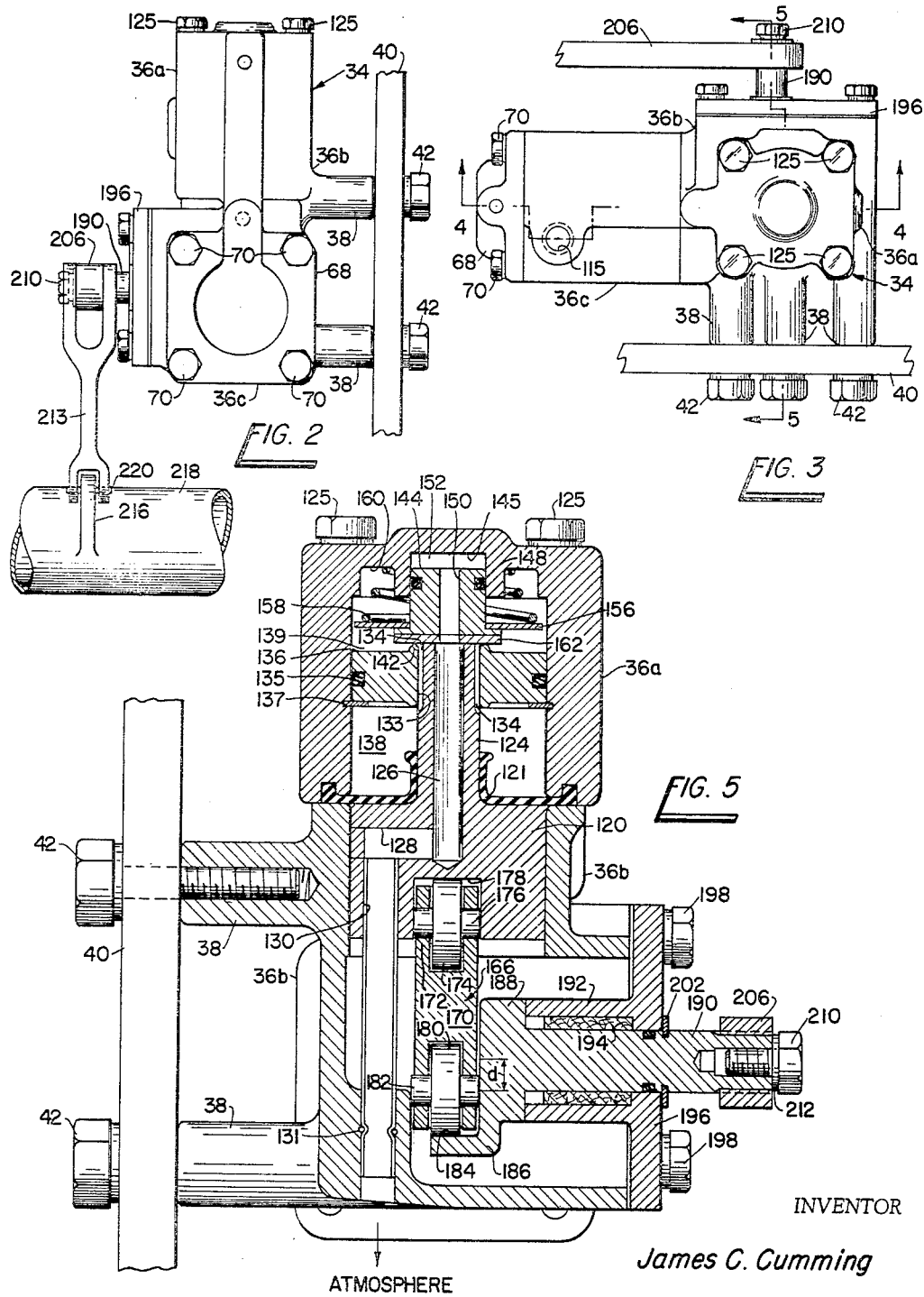

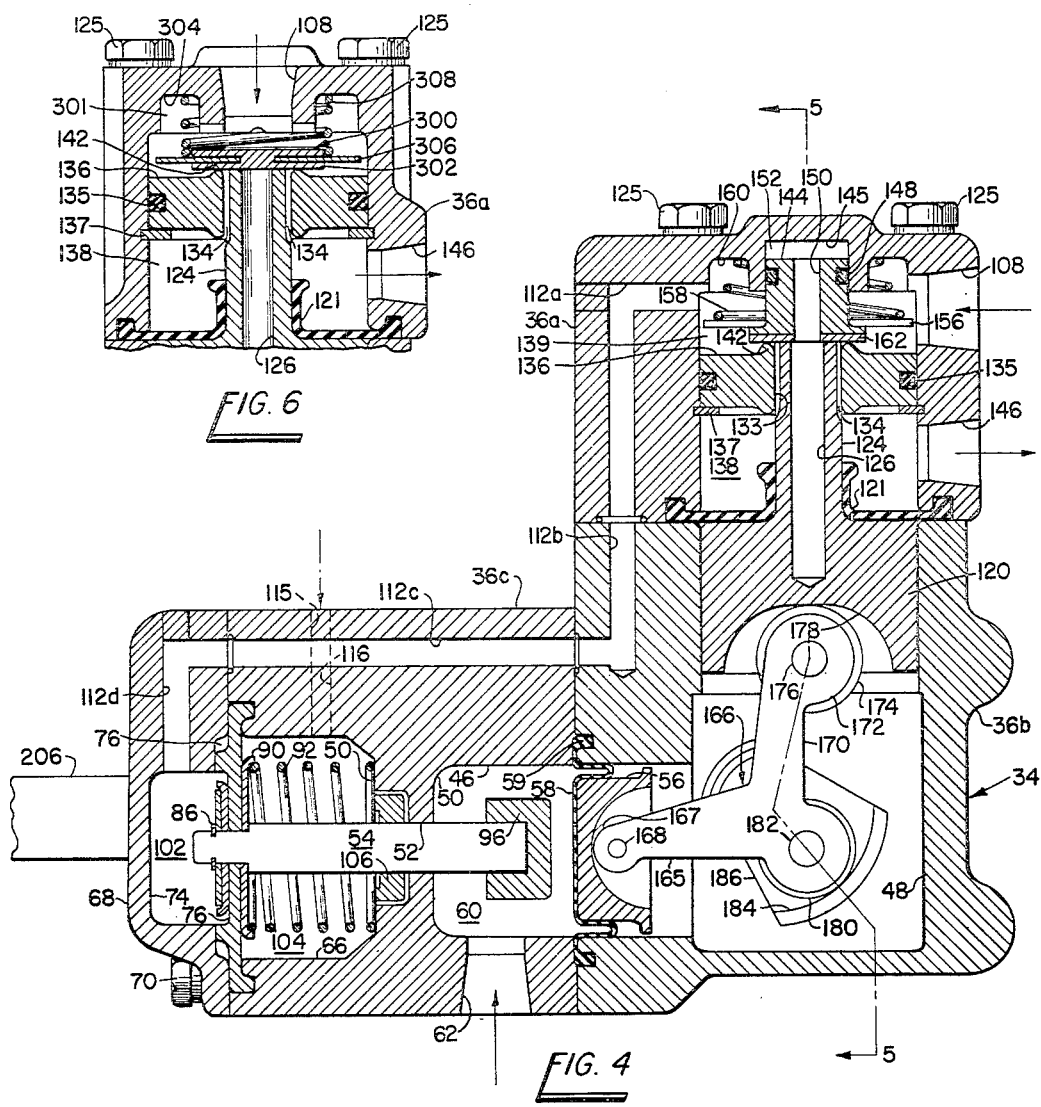

United States Patent Office 3,484,138
Patented Dec. 16, 1969

3,484,138
VEHICLE BRAKE CONTROL MECHANISM
James C. Cumming, Pleasant Ridge, Mich., assignor, by mesne assignments, to Rockwell-Standard Company, Pittsburgh, Pa., a corporation of Delaware
Continuation-in-part of application Ser. No. 604,220, Dec. 23, 1966. This application July 3, 1968, Ser. No. 761,361
Int. Cl. B60t 8/18
U.S. Cl. 303—22                                      6 Claims

ABSTRACT OF THE DISCLOSURE

Vehicle brake control mechanism in which the operating pressure applied to the brakes associated with an individual wheel or a group of wheels is modified in accordance with the load carried by said wheel or group of wheels.

---

This application is a continuation-in-part of application Ser. No. 604,220 filed Dec. 23, 1966, now abandoned, for "Vehicle Brake Control Mechanism."

BACKGROUND OF THE INVENTION

It is common knowledge that the safe limit of deceleration of a vehicle occurs just prior to the wheel lockup preceding skidding. The wheel lockup condition is obtained when a large braking force, normally satisfactory when applied to a wheel carrying a heavy load, is applied, all other conditions remaining the same, to the same wheel when it is carrying a much lighter load. Consequently, in order to improve braking efficiency, it is desirable to apportion the braking force applied to a wheel brake mechanism to the load carried by the wheel.

The load carried by the individual wheels of a road vehicle generally varies from one axle to another according to the static weight distribution which is a function of the longitudinal position of the vehicle center of gravity, which varies with the vehicle loading. In addition, there is considerable load shifting from axle to axle during deceleration of the vehicle under braking and a substantial load shifting from one side of the vehicle to the other during turning and cornering movements.

Correct proportioning of braking forces in a commercial vehicle is further complicated since the loaded weight of the vehicle may be two to four times its weight when unladen, resulting in a substantial reduction of the brake pedal effort required for a wheel lockup condition and loss of control when traveling unladen.

Several prior attempts have been made to control braking effort as a function of load. Typical examples of such prior proposals are disclosed in United States Patents 3,109,681; 3,269,782, and 3,304,129. The effectiveness of these proposals has been limited by the fact that they include load responsive control means which may reach inoperative positions under permanent or transient conditions of extreme deflection or rebound. Further, they do not modulate the braking action as a linear function of load. For example, the addition of a given weight to a moderately loaded vehicle produces an increase in braking effort in these prior devices which is different from that produced by the addition of the same load to a lightly loaded vehicle or to a heavily loaded vehicle.

SUMMARY OF THE INVENTION

The present invention is particularly adapted for incorporation into a vehicle to provide a pneumatic brake system with means for proportioning the braking force applied to a particular axle or wheel of a vehicle to the load carried by the axle or the wheel. This result is achieved by applying to the braking force a modifying factor substantially proportional to the amount of deflection of an individual element of suspension caused by the static or dynamic loading of the particular axle or wheel. Consequently, the present invention proportions the braking force applied to the wheels of an axle or to an individual wheel not only according to the static load carried thereby, but it also apportions the braking force between axles or wheels in response to dynamic weight transfers resulting during deceleration of the vehicle. In addition, the present invention provides means for distributing the braking force between wheels on opposite ends of an axle, if it is desired, to proportion the braking force to the dynamic weight shifting caused by cornering.

By incorporating the present invention into a vehicle braking system, the usual compromise of arbitrarily apportioning braking forces between axles according to habit, experience, or at best, according to calculations of foreseeable optimum weight distribution ratios, may be dispensed with, and a substantially more exact braking force apportionment may be adapted for the purpose of accurately distributing the retardation or deceleration effect according to static and dynamic loads carried by each individual axle, or even each individual wheel. This result is accomplished automatically and leads to greatly improved safety and economy resulting from decreased tire and brake wear.

The principal object of the invention is therefore to provide a brake proportioning means distributing the braking forces between axles or wheels of a vehicle according to the static and dynamic load carried by such axles or wheels.

Another object of the invention is to provide a brake proportioning mechanism distributing the available braking power between axles or wheels of a vehicle in proportion to the amount of deflection of individual elements of the vehicle suspension.

A further object of the invention is to provide a brake proportioning mechanism responsive to a predetermined range of deflection of the vehicle suspension and remaining substantially unaffected by extreme relative deflection beyond such predetermined range.

Other objects of the invention are to provide a brake mechanism fulfilling the above objects and which may be incorporated into conventional brake systems without extensive modifications; without reduction of braking efficiency; without interference with safety devices, such as trailer breakway automatic brake application; which introduces no undue complication in the existing brake system; which requires little attention and maintenance; which increases considerably the braking efficiency of the overall brake system; and which results in economy for the user in reduction of maintenance, tire replacement and brake drum and lining repairs.

Other objects and advantages of the invention will become apparent when the following detailed description of examples of preferred embodiments thereof are considered in conjunction with the accompanying drawings:

BRIEF DESCRIPTION OF DRAWINGS

FIGURE 1 is a diagrammatic illustration of an air braking system adapted for use on a commercial vehicle incorporating the present invention which is shown with a portion of the mechanism broken away to show the internal details;

FIGURE 2 is a front elevation of the air proportioning valve mechanism;

FIGURE 3 is a top plan view of the embodiment of FIGURE 2;

FIGURE 4 is a section along line 4—4 of FIGURE 3;

FIGURE 5 is a fragmentary section along line 5—5 of FIGURE 3;

FIGURE 6 is a vertical fragmentary section on the same plane as FIGURE 4 illustrating a modification of the invention; and FIGURE 7 is a fragmentary elevation of the air proportion mechanism with a portion broken away to show the internal configuration of another modification of the invention.

DESCRIPTION OF PREFERRED EMBODIMENTS

Referring now to the drawings and more particularly to FIGURE 1 thereof, a typical commercial trailer pneumatic brake system incorporating a proportioning valve according to the invention comprises the usual engine-driven air compressor 10 mounted on the tractor and adapted to accumulate compressed air in the trailer reservoir 12 connected to the compressor by a conduit 14 including a check valve 16. The brake system also includes the usual treadle operated control 18 for the purpose of controlling the passage of compressed air into and from the trailer wheel brake cylinder 20, either directly as shown, or through an interposed relay valve, as is well known to those skilled in the art. The wheel brake cylinder 20 is adapted to actuate a conventional wheel brake mechanism 22, of which only a portion is shown.

Pressurized fluid is supplied to the control 18 through conduit 32 from the tractor reservoir 26 served by compressor 10 to which it is connected by way of pipes 14 and 24, the latter containing a check valve 25. A proportioning valve, according to the present invention and designated generally by reference numeral 34 is disposed in the pneumatic circuit between the control 18 and the wheel brake cylinder 20.

The proportioning valve 34 comprises a housing 36 which comprises three separate casings 36a, 36b, 36c, to facilitate manufacturing and assembly.

With reference to FIGURES 2 through 5, housing 36 is provided with integral mounting brackets or lugs such as 38, disposed in an appropriate position for mounting of the housing on a frame member 40 of the trailer or tractor as by bolts 42.

With reference to FIGURES 1 through 5, particularly FIGURE 4, within the housing 36 is disposed a horizontal bore 46, formed within casing 36c and in communication with a vertical bore 48 formed in casing 36b, bores 46 and 48 being substantially at 90° angle. Bore 46 is closed at its outer end by an integrally formed end wall 50 provided with an opening 52 through which projects the end of a rod 54, for a purpose to be explained below. The other end wall of the bore 46 is formed by the face of piston member 56 held by means of a diaphragm 58, a chamber 60 being thus defined between the end wall 50 and the diaphragm piston assembly. The diaphragm 58 is provided with a peripheral ridge 59 clamped in position when the two casings 36b and 36c are assembled.

A port 62, places chamber 60 in communication with the outlet of the brake control 18 by a pipe 64, as shown in FIGURE 1.

Substantially aligned with bore 46, is a second bore 66 closed on its outer end by an end plate 68 secured to casing 36c by bolts 70 which also hold casings 36c and 36b together. A recess 74 is formed in the end plate 68 and is separated from bore 66 by a flexible diaphragm 76 peripherally clamped between casing 36c and plate 68. Rod 54 is clamped to the diaphragm 76 by a retainer 86 assembly. A coil spring 92, arranged around the rod 54 within the bore 66, normally biases the rod to position shown in FIGURE 4 such that the end of the rod projecting within bore 60 and provided with a cap 96 is disposed in such manner that the end face of the cap is normally spaced from the end face of piston member 56.

Diaphragm 76 thus separates chamber 102, in recess 74, from chamber 104 the latter being provided with a conventional stuffing box or seal 106 normally preventing leakage of fluid around rod 54 from chamber 104 to chamber 60. Chamber 102 is at all times in communication with an inlet port 108 in casing 36a, by way of passageway 112a in casing 36a, passageway 112b in casing 36b, passageway 112c in casing 36c and passageway 112d in end cap 68. Port 108 is at all times in communication with reservoir 12 by way of a pipe such as 114. Thus the pressure in chamber 102 is at all times substantially equivalent to the pressure of the fluid in reservoir 12. Chamber 104 is placed in communication by means of port 115 and passageway 116, with the output pipe 14 of the compressor 10, by way of a pipe 118, so that the pressure at all times present in chamber 104 is equivalent to the pressure of the fluid at the output of the compressor. To prevent the rod 54 from being prematurely actuated due to possible pressure fluctuations in the air compressor which might momentarily place a lower pressure within chamber 104 than in chamber 102, which is connected to the relatively constant reservoir pressure, the effective area of diaphragm 76 facing chamber 104 is considerably larger than the opposing effective area facing within chamber 102. As shown in FIGURE 4, bore 48 in casing 36b has a piston member 120 slidably disposed therein, and normally held in position by a diaphragm 121 peripherally clamped between casing 36a and casing 36b, the casings being held together by bolts 125. Piston member 120 is provided with an upwardly projecting stem 124 having a central passageway 126 for communication with the atmosphere through a passageway 128 and a connecting passage provided by a tube 130 (FIGURE 5) carried by piston 120 and slidably received in a bore in housing 36b. A seal 131 is provided to minimize leakage of grease from within the housing. The upper end of the stem 124, projects through a central bore 133 in an annular wall member 136 provided with a sealing ring 135 and held in position by a snap ring 137. The annular wall member 136 thus defines a lower chamber 138 and an upper chamber 139. Four vertical passageways 134 are provided along the upper portion of the piston stem 124. As will become evident later, these passageways 134 provide a path for air to flow from chamber 139 to chamber 138 when the brakes are actuated. The chamber 138 is connected to the brake actuator 20 through a port 146 and a conduit 154. The upper face of annular wall member 136 provides an annular seat 142 for a piston valve member 144, made preferably of delrin, adopted to slidably fit within a cylindrical recess 145. The piston 144 carries an O-ring 148 to prevent air leakage between chamber 139 and chamber 152 and channel 150, the latter being longitudinally disposed in piston 144 and venting through channel 126 to the atmosphere (as best shown in FIGURE 5). Channel 150 vents to the atmosphere at all times so as to prevent the buildup of any back pressure in chamber 152 which might resist the upward movement of piston 144. A light coil spring 158, disposed between a spring retainer 156 and an annular recess 160 normally biases the piston member 144 downwardly to hold an annular seal 162 bonded to the lower face of piston 144, in abutting engagement with the end face of the stem 124 and with annular seat 142. This abutting contact prevents fluid communication between chamber 139 and chamber 138 through the passageways 134. In this manner reservoir 12 is normally cut off from wheel brake cylinder 20.

As shown in FIGURE 4, the axes of piston members 56 and 120 are disposed substantially at a 90° angle, and a balancing arm assembly 166 is disposed therebetween so as to provide a mechanical connection between the piston members. The balancing arm assembly 166 is in the form of a unitary substantially L-shaped member including an arm portion 165 having an end 167 pivotally connected to piston 56 by pivot pin 168.

A second arm portion 170, preferably formed integrally with and disposed substantially at right angles with arm portion 165, has a bifurcated end 172 carrying a pin 176 supporting a roller 174 providing a rolling connection between the arm portion 170 and the flat portion of the substantially arcuate surface 178 disposed on the bottom portion of piston member 120. At the connection between arm portions 165 and 170 is disposed a roller 180 journaled on a pin 182 having its axis disposed substantially at the intersection of the axes of piston members 56 and 120.

Roller 180 normally engages an arcuate cam surface 184 on a cam carried by a cam bracket 186 integral with the enlarged end 188 of a stub shaft 190 (FIGURE 5) rotatably supported by a bearing such as 194 in the bore formed in a boss 192 integral with a closure plate 196 mounted on casing 36b by bolts 198. Stub shaft 190 is held against longitudinal motion by annular retainer 202.

As best shown in FIGURES 1, 4 and 5, the center of rotation of the stub shaft 190, and consequently the center of rotation of the cam surface 184, is disposed a predetermined distance "d" away from the geometric center of cam surface 184, thus providing for a movable fulcrum point for the balancing arm assembly 166, when stub shaft 190 is angularly moved. For this purpose a lever 206 is attached on the projecting end of the shaft 190 by a mounting bolt and washer 210 and 212.

Lever 206 is actuated by an adjustable link 213 having an end pivotally attached to the lever by a pin 214, and its other end pivotally attached to a bracket member 216, or the like, fastened to the axle 218 of the trailer, by pin 220. It can thus be seen that the angular position of lever 206 is determined by the relative position between the frame member 40, supporting the proportioning valve 34, and the axle 218 resulting from the amount of deflection of the individual element of suspension to which the axle is attached. The configuration of the central portion of cam surface 184 is carefully developed to produce, upon a given angular displacement of the shaft 190 which reflects a given load change, a displacement of the lever assembly 166 about the axis of pivot 168 to alter the position of piston 120 and its stem 124 to thereby produce a change in braking force directly proportional to the load change. It will be noted that the central or active portion of the surface 178 is essentially flat to accommodate movement of the roller 174 as the lever assembly 166 is displaced about the pivot 168. The proportioning valve 34 is also equally adaptable for use with an air suspension system by simply replacing the adjustable link 213 with a suitable linkage which would be connected to one end of an air conversion valve sensitive to pressure changes within the air suspension system.

In the present invention, the useful angular motion of the lever 206 has been arbitrarily chosen to extend in range from the midposition shown in full lines in FIGURE 1 to the extreme positions, indicated in phantom outlines at 206a and 206b, at substantially equal angular distances on both sides of the midposition. Extreme deflection of the axle suspension system causes the lever 206 to occupy the position indicated in phantom at 206c, and extreme rebound of the suspension system causes the lever to occupy the position indicated at 206d. These extreme positions, being outside of the useful range of normal travel of the axle relative to the frame in normal operation of the vehicle, the cam surface 184 has circular end portions, the centers of which are on the axis of the shaft 190, the circular end portions being in contact with the roller 180 whenever the lever arm 206 is between positions 206a and 206c or between positions 206b and 206d. Thus, when the brakes are applied with the lever arm positioned between 206a and 206c, or 206b and 206d, the proportioning effect is the same as if the lever arm were positioned at 206a and 206b, respectively.

The example of proportioning valve 34 according to the invention illustrated in FIGURES 1-5 and placed, as previously mentioned, in the circuit between the treadle control 18 on a tractor and the wheel brake cylinder 20 on a trailer, enables the brake cylinder 20 to apply a braking force commensurate with the load carried by the axle or the individual wheel with which the cylinder 20 is associated. The load factor is introduced into the braking system by lever 206 angularly positioning the stub shaft 190 which in turn positions cam surface 184 to displace the fulcrum of proportioning arm assembly 166 in the direction and to the positioning as determined by the deflection of the axle suspension system, or individual wheel suspension system.

In operation, control fluid introduced by pipe 64 into chamber 60 causes piston member 56 to be displaced to the right, thus forcing roller 180 to roll along cam surface 184. Arm portion 165 is thus caused to swing in a counterclockwise direction around the pivot point defined by pin 168, causing arm portion 170 to be displaced upwardly so that roller 174 displaces piston member 120 upwardly against the biasing action of diaphragm 121 and spring 158. The stem 124 of piston member 120 thus causes piston 144 to lift from annular seat 142, permitting the compressed air supplied by the trailer air reservoir 12 to chamber 139 to pass through passageways 134 into chamber 138 thence to the brake cylinder 20, thus operating the wheel brake. The pressure of the air in chamber 138, which is substantially equal to the pressure of the air actuating brake cylinder 20, acts upon piston member 120 through diaphragm 121 and urges piston member 120 downwardly, letting piston 144 drop back on seat 142, thus causing piston member 56 to be urged to the left. By proper design of the respective areas of piston members 56 and 120 at equilibrium, the air pressure in the wheel brake cylinder 20 is proportional to the pressure existing in chamber 60, consequently proportional to the control air pressure in pipe 64 resulting from the amount of depression of treadle control 18. Whenever the pressure in chamber 138 exceeds the pressure which normally maintains the end of stem 124 against seal 162 to close exhaust passageway 126, piston member 120 is displaced downwardly so that chamber 138 is momentarily connected to exhaust passageway 126, via passageways 134 at the same time piston 144 engages annular seat 142. As the original position of piston 120 corresponds to the pressure existing in chamber 60, the pressure in chamber 138 tends to assume a value between reservoir 12 high pressure and an exhaust pressure in channel 126, the exact pressure in chamber 138 depending on the equilibrium position of piston member 56.

If, however, lever 206 occupies the position indicated at 206a of FIGURE 1, stub shaft 190 is caused to rotate to a position which displaces cam member 186 in a clockwise direction, thus forcing cam surface 184 to displace the center of rotation of roller 180 upwardly, displacing lever arm portion 170, bearing roller 174, upwardly. Consequently, the end of stem 124 lifts piston 144 away from annular seat 142, thus placing chamber 138 and the brake cylinder 20 in communication with chamber 139. Consequently, a greater air pressure is supplied to brake wheel mechanism before the feedback effect of the back pressure upon piston member 120 returns the latter to a position cutting off chamber 139 from chamber 138.

If lever 206 is displaced to the position indicated at 206b, the contrary effect is achieved with the result that the air pressure supplied to brake wheel cylinder 20 is reduced in proportion to the angular position of lever 206 corresponding in turn to the amount of decrease of weight causing a decreased deflection of the suspension.

The brake cylinder 20 is released by releasing the treadle control 18 which places chamber 60 in communication with exhaust, via pipe 64 and the internal valving arrangement of the valve 18. The resultant drop of pressure in chamber 60 causes piston member 56 to be displaced in a leftward direction as a result of the downwardly directed force exerted by the air pressure in chamber 138 upon piston member 120. Piston member 120, during its downward travel, causes the end of stem 124 to separate from the bottom face of seal 162 of piston 144, thus placing chamber 138, and consequently brake wheel cylinder 20 in communication with exhaust passageway 126 via passageway 134. The pressure in chamber 138 is reduced to atmospheric pressure and the brake wheel cylinder 20 is released.

In the event of a trailer brakeaway, pipe 118, connected directly to the outlet of the tractor mounted air compressor 10 through line 14, is broken and chamber 104 is vented to atmosphere. However, air pressure remains in chamber 102 which is constantly connected via passageways 112a through 112d, and chamber 139 to trailer reservoir 12. This pressure in chamber 102 displaces rod 54 to the right ultimately displacing piston member 56 to the right. The balance lever 166 is also displaced, displacing piston 120 upwardly. The stem 124 of piston member 120 lifts piston 144 from the annular seat 142, thus allowing air in chamber 139 to pass into chamber 138 via passageways 134. The brake actuator 20 is thus automatically energized, with the result that full braking power is applied to the runaway trailer so as to bring it to a stop in the shortest possible time.

FIGURE 6 illustrates a modification of the proportioning brake valve of the invention which is substantially similar to the preferred embodiment of FIGURE 4, with the exception that the piston valve assembly 144 of FIGURE 4 is replaced by disk valve assembly 300. Also note that port 108 is located in the top wall of casing 36a, rather than in the right wall of casing 36a as shown in FIGURE 4. In each case, port 108 is always in fluid communication with air reservoir 12 through pipe 114, as shown in FIGURE 1.

With particular reference to FIGURE 6, the disk valve assembly 300 comprises a disk 302 maintained substantially centrally in a chamber 301 defined by the upper face of disk valve assembly 300 and the annular recess 304 by a combined spring retainer and locating member 306. Disk 302 is normally urged towards the annular seat 142 by means of a light coil spring 308 having an end engaging spring retainer 306 and the other disposed in annular recess 304. Thus, chamber, 301, which like chamber 139 of FIGURE 4 is normally under pressure, is separated from the exhaust passageway 126 and chamber 301 is normally cut off from chamber 138 by the lower face or disk 302 which engages stem 124.

It can be seen that although the structure of disk valve 300 is different from the structure of the piston valve 144 of the preceding embodiment, the function and the mode of operation thereof are substantially equivalent. The construction of FIGURE 6 provides, however, a greater resistance to upward movement of the piston 120 since the effective area of the disk valve face disposed in chamber 301 is considerably greater than the area consisting of the shouldered surface of piston 144 in the embodiment of FIGURES 1 through 4.

It is evident that the outlet port 146 shown connected in FIGURE 1 to a brake wheel cylinder 20 may be connected to two cylinders, applying the brakes to two opposite wheels on both ends of a given axle, in applications of the invention where it is not desired to proportion the wheel braking force to the individual wheel loading caused by dynamic weight shifting during cornering. In most installations, one proportioning valve according to the invention is connected between the brake control and a group of wheel brake cylinders, at least two on a common axle. In more refined installation, where complete brake effort proportioning is sought, one proportioning valve is used in combination with each wheel brake cylinder.

FIGURE 7 represents a modification of the examples of FIGURES 1–5 of the invention showing a proportioning valve housing 36 embodying substantially the same structural arrangements of components as previously described in FIGURES 1–5. The modification of FIGURE 7, however, differs from the previous embodiments as it omits the fail-safe runaway portion thereof normally housed in casing 36c. End cap 68 of FIGURE 4 is replaced by cap 310 provided with a recess 312 forming a chamber 314 in fluid communication with port 316 connected to control air obtained at the outlet of the treadle control valve, not shown. The control air pressure in chamber 314 thus displaces piston member 56 with a pressure commensurate to the pressure in chamber 134. Consequently, piston member 56 is adapted to displace proportioning arm assembly 166 in proportion to the control pressure in chamber 314, in the same manner and the same purpose as hereinbefore explained in detail.

It is contemplated that the modification of FIGURE 7 is to be mounted upon a truck-tractor, or upon a bus, a truck or a passenger car, for providing roadwheel braking forces proportional to the weight carried by such roadwheels and it clearly does not require a fail-safe runaway automatic brake control as is generally required or desirable in commercial trailer brake systems.

It is obvious that the herein examples of structural embodiments of the invention are given for illustrative purposes only so as to facilitate the understanding of the principles of the invention, and that many variations omissions and substitutions of elements will become apparent to those skilled in the art without departing from the spirit and scope of the invention.

I claim:

1. A proportioning valve adapted to be incorporated in a vehicle pneumatic brake system comprising a brake control adapted to supply control air at variable pressure according to the amount of desired braking force and a road wheel brake actuator adapted to provide a braking force on said road wheel as a function of the pressure of said control air, said proportioning valve being disposed between the output of said brake control and the input of said brake actuator and comprising: a housing mounted on a frame member of the vehicle and having a first bore defining a first chamber at all times in fluid communication with said brake control, a second bore having an axis substantially at right angles with the axis of said first bore and defining a second chamber at all times in fluid communication with said brake actuator, a third bore aligned with said second bore and defining a third chamber at all times in fluid communication with a source of air under pressure, and an annular wall separating said second chamber from said third chamber, said annular wall being provided with a substantially centrally disposed aperture; a first piston member closing one end of said first chamber and movable in a first direction under the influence of the control air pressure in said first chamber; a second piston member closing one end of said second chamber; a stem integral with said second piston member and having an end projecting into said third chamber through said aperture in said annular wall; an exhaust channel in said stem at all times in fluid communication with atmosphere and opening at the end of said stem; passageways disposed in said stem adapted to connect said third and second chambers; an annular seat on the face of said annular wall disposed in said third chamber and surrounding said end of the stem; a spring biased valve member in said third chamber normally seating on both said end of said stem and said annular seat to normally cut off said third chamber from said second chamber and said exhaust channel; a proportioning arm assembly member operatively connecting said first and said second piston members and comprising two arm portions disposed at right angles to each other, the free end of one of said arm portions being pivotally connected to the side of said first piston member disposed toward said second chamber and the free end of the other of said arm portions bearing a roller adapted to engage the flat portion of a substantially arcuate surface on the side of said second piston disposed toward said first chamber; a roller carried by said proportioning arm assembly member and journaled at the fulcrum point thereof, said fulcrum point corresponding to the intersection of the centerlines of said arm portions; an angularly movable eccentric cam surface of a predetermined arcuate contour arranged to engage said roller; means adapted to angularly move said eccentric cam surface so as to cause the fulcrum point of said proportioning arm assembly member to be displaced along a path dependent from the contour of said cam surface and the angular position thereof, whereby the motion of said second piston member in a first direction is determined by the motion of said first piston member and the relative instantaneous positions of said piston members are variable according to the angular position of said cam surface; a lever arrangement angularly positioning said cam surface as a function of the amount of deflection of an element of the suspension of said vehicle so as to cause said cam surface to displace the fulcrum point of said proportioning arm assembly member in a direction that causes the end of said stem to increase the lift of said valve member from said annular seat as a function of the increase of deflection of said element of suspension so as to admit more air under pressure through said passageways from said third chamber to said second chamber when said element of suspension is deflected than when said element of suspension is in an undeflected state; and a limited area on said second piston member exposed to the air pressure in said second chamber for displacing said second piston member in a second direction opposite to said first direction to cause said projecting portion to allow said valve member to engage said annular seat when the force exerted upon the face of said first piston member exposed to the control air pressure in said first chamber is removed; whereby when the control air pressure in said first chamber is removed, said second piston member is further displaced in said second direction causing the end of said stem to disengage said valve member so as to place said second chamber in communication with said exhaust channel.

2. The proportioning valve of claim 1 adapted to be mounted upon a trailer adapted to be drawn by a tractor and wherein; said third chamber is at all times in fluid communication with a trailer mounted air reservoir; a rod member is disposed with an end proximate the face of said first piston member; the body of said rod member extends through a fourth chamber at all times in fluid communication with the output of a tractor mounted air compressor by a pipe; the other end of said rod member is attached to a flexible diaphragm separating said fourth chamber from a fifth chamber; said fifth chamber is at all times in fluid communication with the trailer air reservoir; whereby upon a break occurring in said pipe resulting in loss of pressure in said fourth chamber, the air pressure in said fifth chamber causes displacement of said diaphragm toward said fourth chamber, thereby causing the end of said rod to engage the face of said first piston member for displacing said first piston member and said second piston member operatively connected therewith by way of said proportioning arm assembly member to a position that causes the end of said stem to fully lift said valve member from said annular seat so as to admit pressurized air from said third chamber to said second chamber to apply said brake.

3. The proportioning valve of claim 1 wherein: said cam surface is adapted to displace the fulcrum point of said proportioning arm assembly member between predetermined limits corresponding to a predetermined range of deflection of said element of suspension; and wherein further deflection and relaxation of said element of suspension beyond said predetermined range causes no further displacement of said fulcrum point.

4. Means for varying the pressure of fluid applied to a fluid pressure brake actuator from a line supplying fluid at a predetermined pressure, said means comprising: first control means movable in one direction under the influence of fluid at selected control pressure; lever means having a pair of relatively immovable arms and having a fulcrum at the intersection of the arms and having one arm pivotally connected to said first control means for displacement thereby; a chamber having an inlet in fluid communication with said line and an outlet in fluid communication with said brake actuator; port means between said inlet and outlet; valve means normally closing said port means; means normally urging said valve means in a direction to close said port means; second control means disposed in said chamber and normally engaged by the other arm of said lever for urging said valve means in a direction to open said port means; said second control means having a surface exposed to the pressure of said fluid at said outlet for substantially balancing the position of said second control means against the force of said lever means; exhaust port means for venting said pressure at the outlet to atmosphere upon retraction of said second control means away from said valve means; an arcuate cam surface for locating the fulcrum of said lever; means mounting said cam surface for rotation about an axis displaced from the fulcrum of said lever and from the geometric center of said cam surface; and operating means attached to said cam surface for controlling the position thereof to thereby displace said fulcrum.

5. Means for controlling the pressure of fluid applied to a fluid pressure vehicle brake actuator from a line supplying fluid at a predetermined pressure, said means comprising: a valve body and a valve element movable in said body for controlling admission of fluid from said line to said actuator; a first member exposed to the pressure of control fluid admitted to said valve body; a second member disposed substantially at right angles with said first member and exposed to the pressure supplied to said actuator; means associated with said second member and adapted to operate said valve element; a unitary angle proportioning member operatively connecting said first member to said second member; a fulcrum point on said angled proportioning member displaceable along a path defined by an arcuate cam surface; and means for angularly positioning said cam surface about an axis displaced from said fulcrum point and from the geometric center of said arcuate cam surface so as to controllably modify the path of said fulcrum point.

6. In a vehicle brake system having a source of fluid pressure, a brake actuator and a valve connected to control the flow of fluid from said source to said actuator; means for controlling said valve comprising a fluid pressure responsive member connected to said valve and having a surface exposed to the pressure supplied to said actuator; a second fluid pressure responsive member having a surface exposed to a control pressure; a unitary lever connecting said second fluid pressure responsive member to said first fluid pressure responsive member; a cam having a curved surface providing a fulcrum for said lever; means mounting said cam for rotation about an axis offset from said fulcrum and from the geometric center of said surface; and means for varying the position of said cam to thereby vary the position of said fulcrum.

References Cited

UNITED STATES PATENTS

| 3,109,681 | 11/1963 | Wilson | 303—22 |
| 3,186,771 | 6/1965 | Alfieri | 303—22 |
| 3,269,782 | 8/1966 | Jolly | 303—22 X |
| 3,304,129 | 2/1967 | Wilson | 303—22 X |
| 3,327,816 | 6/1967 | Eaton | 188—195 |

MILTON BUCHLER, Primary Examiner

J. J. McLAUGHLIN, JR., Assistant Examiner

U.S. Cl. X.R.

303—7, 40